(12) United States Patent
Ahn et al.

(10) Patent No.: US 10,129,537 B2
(45) Date of Patent: Nov. 13, 2018

(54) AUTOSTEREOSCOPIC 3D DISPLAY APPARATUS

(71) Applicant: Korea Electronics Technology Institute, Seongnam-si, Gyeonggi-do (KR)

(72) Inventors: Yang Keun Ahn, Seoul (KR); Kwang Soon Choi, Goyang-si (KR); Young Choong Park, Goyang-si (KR)

(73) Assignee: Korea Electronics Technology Institute, Seongnam-si, Gyeonggi-do (KR)

( * ) Notice: Subject to any disclaimer, the term of this patent is extended or adjusted under 35 U.S.C. 154(b) by 111 days.

(21) Appl. No.: 15/468,817

(22) Filed: Mar. 24, 2017

(65) Prior Publication Data
US 2018/0103249 A1    Apr. 12, 2018

(30) Foreign Application Priority Data

Oct. 11, 2016   (KR) ................. 10-2016-0131310

(51) Int. Cl.
*G02B 27/01* (2006.01)
*G02B 27/10* (2006.01)
(Continued)

(52) U.S. Cl.
CPC ....... *H04N 13/361* (2018.05); *G02B 27/0101* (2013.01); *G02B 27/144* (2013.01);
(Continued)

(58) Field of Classification Search
CPC  G02B 27/2214; G02B 27/225; G02B 5/3083; G02B 2027/014; G02B 2027/0134; G02B 27/2235; G02B 1/12; G02B 27/10; H04N 13/305; H04N 13/363; H04N 13/302; H04N 13/31; H04N 13/315; H04N 13/00; H04N 13/194; G06F 3/011;
(Continued)

(56) References Cited

U.S. PATENT DOCUMENTS 5,726,800 A * 3/1998 Ezra ................... G02B 27/0093
                                                                359/466
2006/0109753 A1* 5/2006 Fergason ............... G02B 27/26
                                                                369/30.01
(Continued)

FOREIGN PATENT DOCUMENTS

JP   H11-91404 A   4/1999

OTHER PUBLICATIONS

Korean Office Action dated Sep. 11, 2017 from KIPO in connection with the counterpart Korean Patent Application No. 10-2016-0131310, citing the above reference(s).

*Primary Examiner* — Nathnael Aynalem
(74) *Attorney, Agent, or Firm* — Hauptman Ham, LLP

(57) ABSTRACT

An autostereoscopic three-dimensional (3D) display apparatus is provided. The autostereoscopic 3D display apparatus includes an image display unit configured to display a 3D image including a 3D virtual object or a 3D image including a 3D virtual object and text; and an optical unit configured to reflect or transmit the displayed 3D image from the image display unit toward a viewer, transmit an image of a real object facing the viewer, and display a combination of the 3D image and the image of the real object to the viewer.

11 Claims, 6 Drawing Sheets

(51) Int. Cl.
*G02B 27/22* (2018.01)
*H04N 13/361* (2018.01)
*H04N 13/305* (2018.01)
*H04N 13/31* (2018.01)
*G02B 27/14* (2006.01)
*G06T 19/00* (2011.01)
*H04N 13/346* (2018.01)

(52) U.S. Cl.
CPC .......... *G06T 19/006* (2013.01); *H04N 13/305* (2018.05); *H04N 13/31* (2018.05); *H04N 13/346* (2018.05); *G02B 2027/0134* (2013.01); *G02B 2027/0141* (2013.01)

(58) Field of Classification Search
CPC .......... G06F 2200/1612; G07F 17/3211; G02F 1/133536; G02F 1/29; G06T 19/006; G06T 15/00
See application file for complete search history.

(56) References Cited

U.S. PATENT DOCUMENTS

| | | | | |
|---|---|---|---|---|
| 2006/0132915 | A1* | 6/2006 | Yang | G02B 27/0093 359/463 |
| 2006/0268407 | A1* | 11/2006 | Fergason | G02B 27/26 359/485.02 |
| 2012/0050505 | A1* | 3/2012 | Yabui | G02B 27/2235 348/54 |
| 2012/0313839 | A1* | 12/2012 | Smithwick | G02B 27/2214 345/6 |
| 2015/0226965 | A1* | 8/2015 | Kim | G02B 27/0101 359/463 |
| 2015/0261005 | A1* | 9/2015 | Choi | G02B 27/26 353/8 |
| 2015/0334269 | A1* | 11/2015 | Yokota | G06K 9/00805 382/103 |
| 2016/0209647 | A1* | 7/2016 | Fursich | G02B 27/0093 |

* cited by examiner

AUTOSTEREOSCOPIC 3D DISPLAY APPARATUS

CROSS-REFERENCE TO RELATED APPLICATION

This application claims priority to and the benefit of Korean Patent Application No. 10-2016-0131310, filed on Oct. 11, 2016, the disclosure of which is incorporated herein by reference in its entirety.

BACKGROUND

1. Field of the Invention

The present invention relates to an autostereoscopic three-dimensional (3D) display apparatus, and more particularly, to an autostereoscopic 3D display apparatus capable of implementing augmented reality.

2. Discussion of Related Art

In general, the distance between both eyes is referred to as an interocular distance. When an object is viewed, slightly different images of the object are observed due to the interocular distance. This phenomenon is referred to as binocular disparity. A human may feel a three-dimensional (3D) effect due to the binocular disparity.

Thus, two different two-dimensional (2D) images are seen with left and right eyes. When the two different 2D images are transferred to the brain through the retinas, the brain may blend them and reproduce a 3D image that is realistic representation of an object with a sense of depth. In general, this process is referred to as stereography.

In general, techniques of realizing a 3D image use binocular disparity. In the techniques, an image seen with a left eye in a left direction (the left-eye image) and an image seen with a right eye in a right direction (the right-eye image) are provided to give parallax to both eyes.

Examples of a method of separating a left-eye image and a right-eye image from each other and respectively providing the left-eye image and the right-eye image to left and right eyes include a stereoscopic method and an autostereoscopic method. Examples of the autostereoscopic method include a parallax barrier method and a lenticular method.

In a 3D display method using the autostereoscopic method, a real object behind a display panel is not seen. Thus, the 3D display method using the autostereoscopic method is not applicable to providing services, such as an augmented reality service, for which a real object behind a display panel should be seen.

SUMMARY OF THE INVENTION

The present invention is directed to an autostereoscopic three-dimensional (3D) display apparatus capable of implementing augmented reality by allowing an object behind a display screen to be observed to naked eyes.

According to an aspect of the present invention, an autostereoscopic three-dimensional (3D) display apparatus includes an image display unit configured to display a 3D image including a 3D virtual object or a 3D image including a 3D virtual object and text; and an optical unit configured to reflect or transmit the displayed 3D image from the image display unit toward a viewer and transmit an image of a real object facing the viewer to display a combination of the 3D image and the image of the real object to the viewer.

The optical unit may include one beam splitter in front of the real object. The image display unit may include a first image display unit located below the beam splitter and configured to display the 3D image including the 3D virtual object. The beam splitter may reflect the 3D image from the first image display unit toward the viewer.

The optical unit may include one beam splitter in front of the real object. The image display unit may display the 3D image including the 3D virtual object and the text. The beam splitter may reflect the 3D virtual object from the image display unit toward the viewer and reflect or transmit the text from the image display unit toward the viewer.

The image display unit may include a first image display unit configured to display the 3D virtual object; and a second image display unit configured to display the text. The first and second image display units may be located in a vertical structure below the beam splitter such that the second image display unit is located above the first image display unit.

The image display unit may include a first image display unit for displaying the 3D virtual object; and a second image display unit for displaying the text. The first image display unit may be located below the beam splitter. The second image display unit may be located in front of the beam splitter.

The image display unit may include a first image display unit for displaying the 3D virtual object; and a second image display unit for displaying the text. The first image display unit may be located below the beam splitter, and the second image display unit may be located behind the beam splitter.

The first image display unit may be a low-definition autostereoscopic 3D display panel. The second image display unit may be a high-definition transparent 2D display panel.

The image display unit may display the 3D image including the 3D virtual object and the text. The optical unit may include a first beam splitter configured to reflect or transmit the 3D virtual object and the text from the image display unit; and a second beam splitter configured to reflect the 3D virtual object and the text incident from the first beam splitter toward the viewer.

The second beam splitter may be located below the first beam splitter to be symmetrical to the first beam splitter.

The image display unit may include a first image display unit for displaying the 3D virtual object; and a second image display unit for displaying the text. The first image display unit may be located in front of the second beam splitter, and the second image display unit may be located below the second beam splitter.

The image display unit may include a first image display unit for displaying the 3D virtual object; and a second image display unit for displaying the text. The first image display unit may be located below the second beam splitter, and the second image display unit may be located in front of the second beam splitter.

The first image display unit may be a low-definition autostereoscopic 3D display panel, and the second image display unit may be a high-definition transparent 2D display panel.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
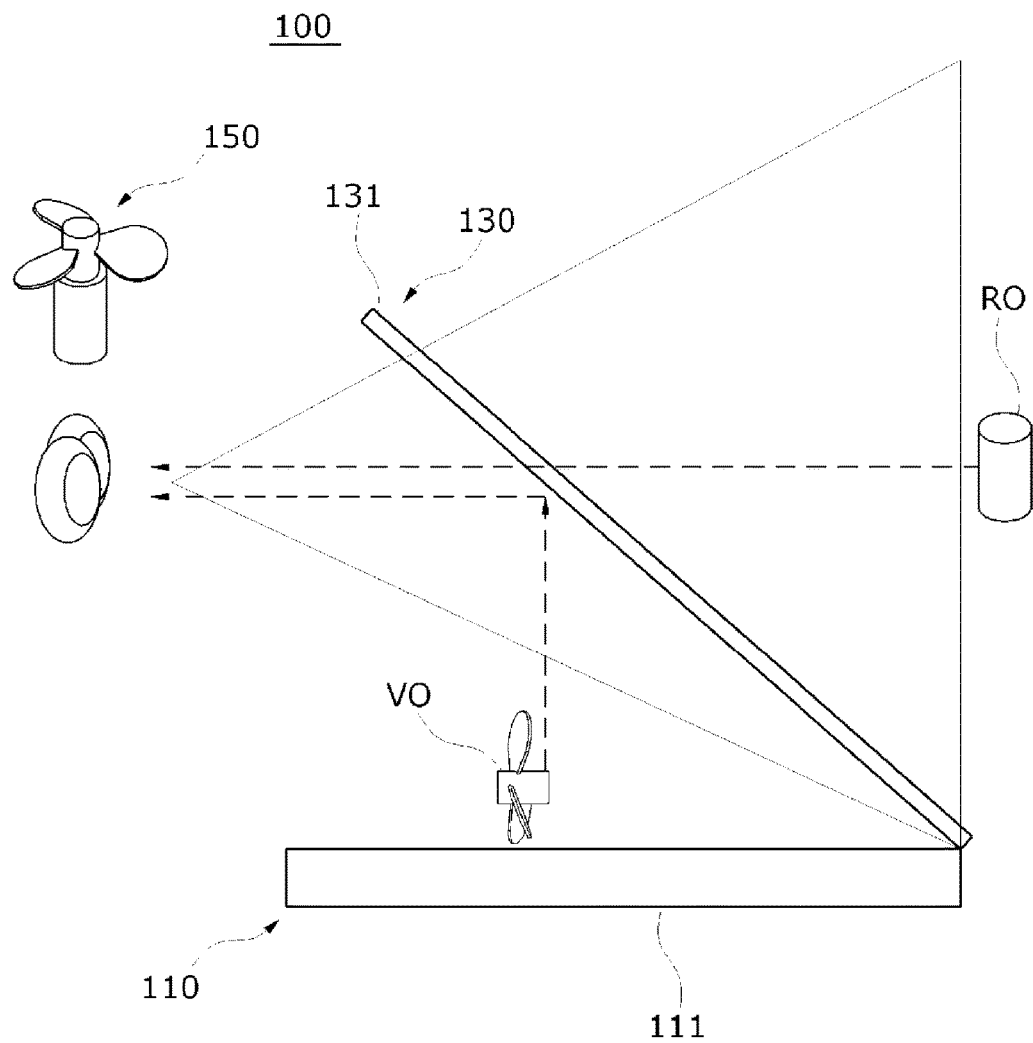
FIG. 1 is a diagram illustrating a structure of an autostereoscopic three-dimensional (3D) display apparatus according to a first embodiment of the present invention.

A description of specific structures or functions of embodiments of the present invention set forth herein is simply provided to describe these embodiments. Embodiments of the present invention may be embodied in many different forms and are thus not construed as being limited to those set forth herein.

Various changes may be made in form and details of the present invention and thus exemplary embodiments are illustrated in the drawings and described herein in detail. However, it should be understood that the present invention is not limited thereto and is to cover all modifications, equivalents, and alternatives falling within the scope of the invention.

It will be understood that, although the terms first, second, third, etc., may be used herein to describe various elements, these elements should not be limited by these terms. These terms are only used to distinguish one element from another element. Thus, a first element discussed below could be termed a second element without departing from the teachings of the present invention.

It will be understood that when an element is referred to as being 'connected to' or 'coupled to' another element, the element can be directly connected or coupled to another element or intervening elements. In contrast, it will be understood that when an element is referred to as being 'directly connected to' or 'directly coupled to' another element, there are no intervening elements present. Other expressions describing the relationship between elements, e.g., 'between' and 'right between' or 'neighboring to' and 'directly neighboring to' should be understood likewise.

The terminology used herein is for the purpose of describing particular embodiments only and is not intended to be limiting of the invention. As used herein, the singular forms 'a', 'an' and 'the' are intended to include the plural forms as well, unless the context clearly indicates otherwise. It will be further understood that the terms 'comprise' and/or 'comprising,' when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

When an embodiment may be implemented differently, functions or operations described in specific blocks may be performed differently from the order described in a flowchart. For example, two continuous blocks may be performed substantially simultaneously, and may be performed in an opposite order according to a related function or operation.

Hereinafter, an autostereoscopic three-dimensional (3D) display apparatus according to an embodiment of the present invention will be described in greater detail with reference to the accompanying drawings.

FIG. 1 is a diagram illustrating a structure of an autostereoscopic 3D display apparatus 100 according to a first embodiment of the present invention.

Referring to FIG. 1, the autostereoscopic 3D display apparatus 100 according to the first embodiment of the present invention includes an image display unit 110 and an optical unit 130.

The image display unit 110 is configured to display a 3D image. The 3D image displayed using the image display unit 110 includes a 3D virtual object VO.

Hereinafter, for convenience of explanation, it will be described that the image display unit 110 displays the 3D virtual object VO.

In this case, the image display unit 110 may be embodied as an autostereoscopic 3D display panel (first image display unit) 111. For example, the image display unit 110 may be embodied as a parallax barrier type 3D display panel or a lenticular type 3D display panel.

The optical unit 130 is configured to reflect the 3D virtual object VO displayed on the image display unit 110 toward a viewer, transmits an image of a real object RO facing the viewer to display a synthetic object 150 which is a combination of the 3D virtual object VO and the image of the real object RO to the viewer.

The optical unit 130 may be embodied as, for example, one beam splitter 131, and installed to be tilted on the image display unit 110. In this case, the real object RO is located behind the optical unit 130 with respect to the viewer.

That is, the optical unit 130 is installed on the image display unit 110 to reflect the 3D virtual object VO displayed on the image display unit 110 toward a viewer and transmit the image of the real object RO behind the optical unit 130 to display the synthetic object 150 which is a combination of the 3D virtual object VO and the image of the real object RO to the viewer.

In this case, the beam splitter 131 is installed to be tilted toward the viewer according to the characteristics of the beam splitter 131 used as the optical unit 130. That is, the beam splitter 131 is installed to be tilted in a direction opposite to the real object RO.

Thus, in the autostereoscopic 3D display apparatus 100 according to the first embodiment of the present invention, the 3D virtual object VO displayed on the image display unit 110 is reflected toward the viewer by the optical unit 130, and the image of the real object RO behind the optical unit 130 is transmitted through the optical unit 130 and displayed to the viewer.

Thus, the viewer may view the synthetic object 150 which is a combination of the image of the real object RO and the 3D virtual object VO from the image display unit 110. Accordingly, augmented reality may be implemented using the autostereoscopic 3D display apparatus 100 according to the first embodiment of the present invention.

In general, an autostereoscopic 3D display apparatus simultaneously displays eight viewpoints. In this case, real visible resolution decreases to ⅛. When the autostereoscopic 3D display apparatus simultaneously displays two viewpoints, real visible resolution decreases to ½.

In the first embodiment of the present invention, the image display unit 110 displays the 3D virtual object VO but may display text, as well as the 3D virtual object VO.

However, when text is displayed using a multi-viewpoint autostereoscopic 3D display apparatus, the resolution of the text is low and thus the text is difficult to be recognized with an eye.

A case in which an image display unit displays a 3D virtual object and text together will be described below.

Figure 2A:
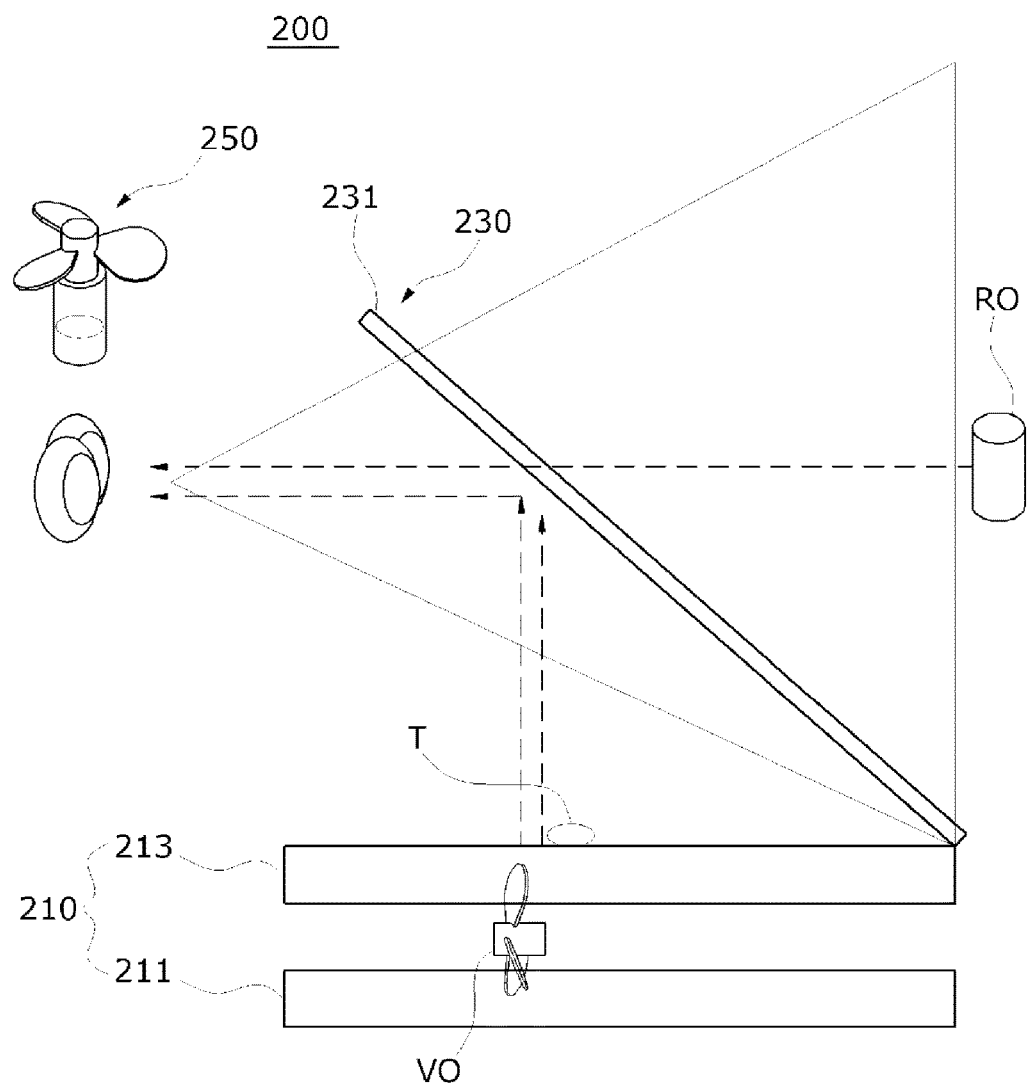
FIG. 2A is a diagram illustrating a structure of one example of an autostereoscopic 3D display apparatus according to a second embodiment of the present invention.
Figure 2B:
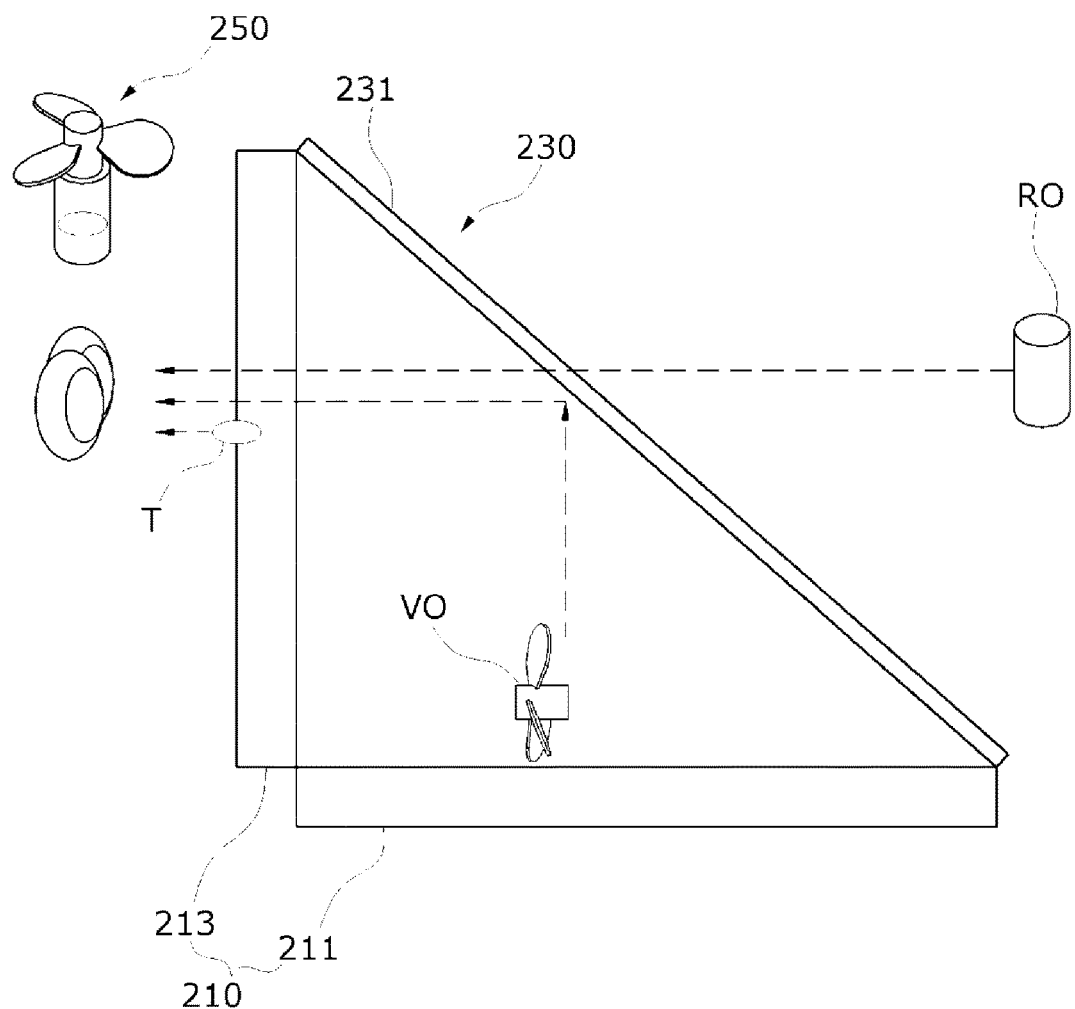
FIG. 2B is a diagram illustrating a structure of another example of an autostereoscopic 3D display apparatus according to the second embodiment of the present invention.
Figure 2C:
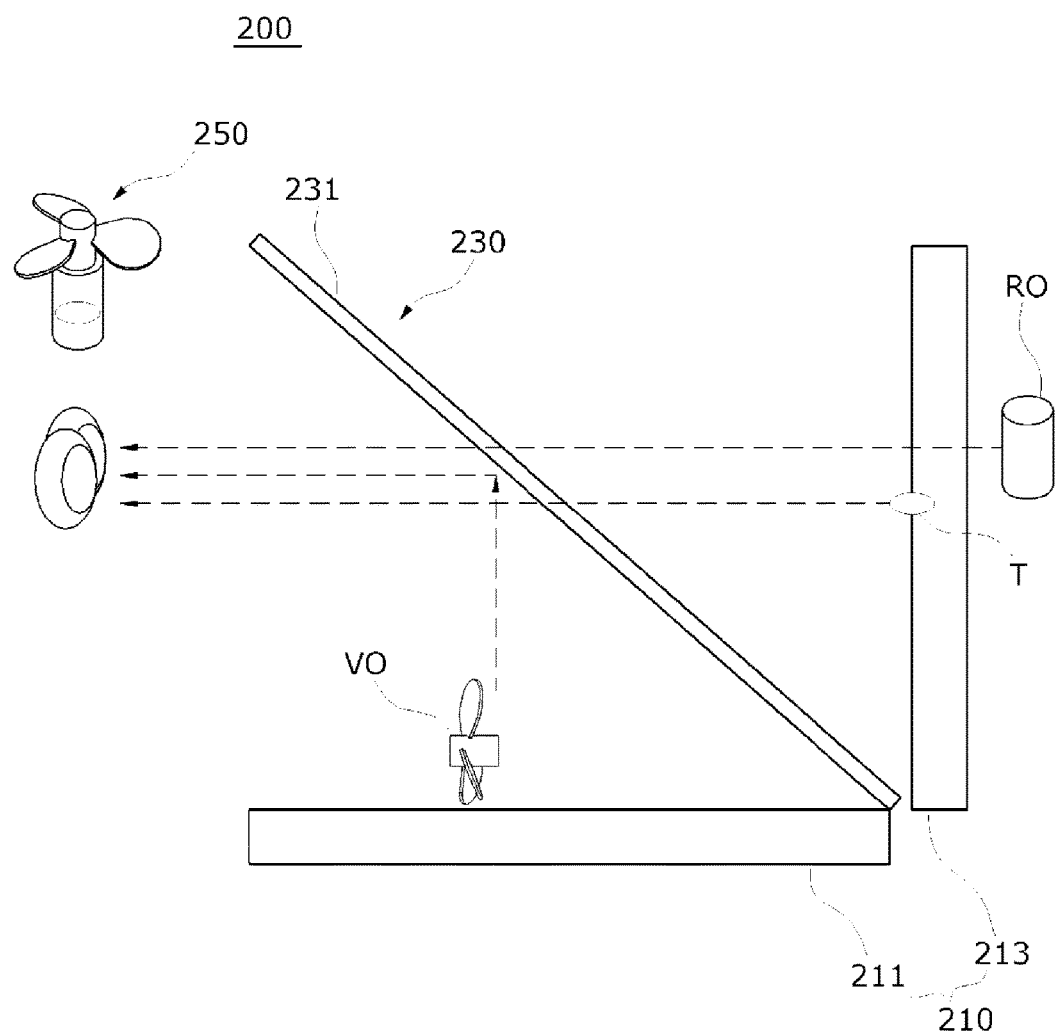
FIG. 2C is a diagram illustrating a structure of another example of an autostereoscopic 3D display apparatus according to the second embodiment of the present invention.

FIG. 2A is a diagram illustrating a structure of one example of an autostereoscopic 3D display apparatus according to a second embodiment of the present invention. FIG. 2B is a diagram illustrating a structure of another example of an autostereoscopic 3D display apparatus according to the second embodiment of the present invention. FIG. 2C is a diagram illustrating a structure of another example of an autostereoscopic 3D display apparatus according to the second embodiment of the present invention.

Referring to FIGS. 2A to 2C, an autostereoscopic 3D display apparatus 200 according to the second embodiment of the present invention includes an image display unit 210 and an optical unit 230.

The image display unit 210 is configured to display a 3D image. The 3D image displayed using the image display unit 210 includes a 3D virtual object VO and text T.

For convenience of explanation, it will be described below that the image display unit 210 displays the 3D virtual object VO and the text T.

In this case, the image display unit 210 may include a first image display unit 211 for displaying the 3D virtual object VO and a second image display unit 213 for displaying the text T.

The first image display unit 211 may be a low-definition autostereoscopic 3D display panel. The second image display unit 213 may be a high-definition transparent two-dimensional (2D) display panel.

That is, the autostereoscopic 3D display apparatus 200 according to the second embodiment of the present invention is different from the autostereoscopic 3D display apparatus 100 according to the first embodiment of the present invention in that the second image display unit 213 for displaying the text T is further provided.

The optical unit 230 is configured to reflect the 3D virtual object VO displayed on the image display unit 210 toward a viewer, reflect or transmit the text T displayed on the image display unit 210, and transmit an image of a real object RO facing the viewer to display a synthetic object 250 which is a combination of the 3D virtual object VO, the image of the real object RO, and the text T to the viewer.

In this case, the optical unit 230 may be embodied as, for example, one beam splitter 231. The real object RO is located behind the optical unit 230 with respect to the viewer.

The beam splitter 231 is installed to be tilted toward the viewer according to the characteristics of the beam splitter 231 used as the optical unit 230. That is, the beam splitter 231 is tilted in a direction opposite to the real object RO.

The relationship between the locations of the image display unit 210 and the optical unit 230 of the autostereoscopic 3D display apparatus 200 according to the second embodiment of the present invention will be described in detail below.

According to the second embodiment of the present invention, the image display unit 210 is embodied as two image display units 211 and 213 and the optical unit 230 is embodied as one beam splitter 231.

As illustrated in FIG. 2A, the beam splitter 231 may be located in front of the real object RO with respect to the viewer, and the first image display unit 211 and the second image display unit 213 may be arranged in a vertical structure below the beam splitter 231 such that the first image display unit 211 is located below the second image display unit 213.

As described above, the reason why the first image display unit 211 is located below the second image display unit 213 is that the 3D virtual object VO displayed on the first image display unit 211 may be transmitted when the second image display unit 213 which is transparent is located on a front surface of the first image display unit 211.

Thus, after the 3D virtual object VO displayed on the first image display unit 211 is transmitted through the second image display unit 213 in front of the first image display unit 211, the 3D virtual object VO arrives at the beam splitter 231 and is then reflected toward the viewer by the beam splitter 231.

The text T displayed on the second image display unit 213 is reflected toward the viewer by the beam splitter 231. The real object RO behind the beam splitter 231 is transmitted by the beam splitter 231 and is then displayed to the viewer.

Thus, the viewer may view the synthetic object 250 which is a combination of the 3D virtual object VO from the first image display unit 211, the text T from the second image display unit 213, and the image of the real object RO. Thus, augmented reality may be implemented using the autostereoscopic 3D display apparatus 200 of FIG. 2A.

As illustrated in FIG. 2B, the beam splitter 231 may be located in front of the real object RO with respect to the viewer, the first image display unit 211 may be located below the beam splitter 231, and the second image display unit 213 may be located in front of the beam splitter 231 with respect to the viewer.

That is, the second image display unit 213 is located in front of the beam splitter 231, the real object RO is located behind the beam splitter 231, and the first image display unit 211 is located below the beam splitter 231.

Thus, the 3D virtual object VO displayed on the first image display unit 211 is reflected toward the viewer by the beam splitter 231, the text T displayed on the second image display unit 213 is displayed toward the viewer, and the image of the real object RO is transmitted through the beam splitter 231 and the second image display unit 213 and is then displayed to the viewer.

Thus, the viewer may view a synthetic object 250 which is a combination of the 3D virtual object VO from the first image display unit 211, the text T from the second image display unit 213, and the image of the real object RO. Accordingly, augmented reality may be implemented using the autostereoscopic 3D display apparatus 200 of FIG. 2B.

As illustrated in FIG. 2C, the beam splitter 231 may be located in front of a real object RO with respect to a viewer, the first image display unit 211 may be located below the beam splitter 231, and the second image display unit 213 may be located between the beam splitter 231 and the real object RO.

That is, the first image display unit 211 is located below the beam splitter 231, the second image display unit 213 is located behind the beam splitter 231, and the real object RO is located behind the second image display unit 213.

Thus, the 3D virtual object VO displayed on the first image display unit 211 is reflected toward the viewer by the beam splitter 231, the text T displayed on the second image display unit 213 is transmitted through the beam splitter 231 and displayed to the viewer, and the image of the real object RO is transmitted through the second image display unit 213 and the beam splitter 231 and is then displayed to the viewer.

Accordingly, the viewer may view a synthetic object 250 which is a combination of the 3D virtual object VO from the first image display unit 211, the text T from the second image display unit 213, and the image of the real object RO and thus augmented reality may be implemented using the autostereoscopic 3D display apparatus 200 of FIG. 2C.

Figure 3A:
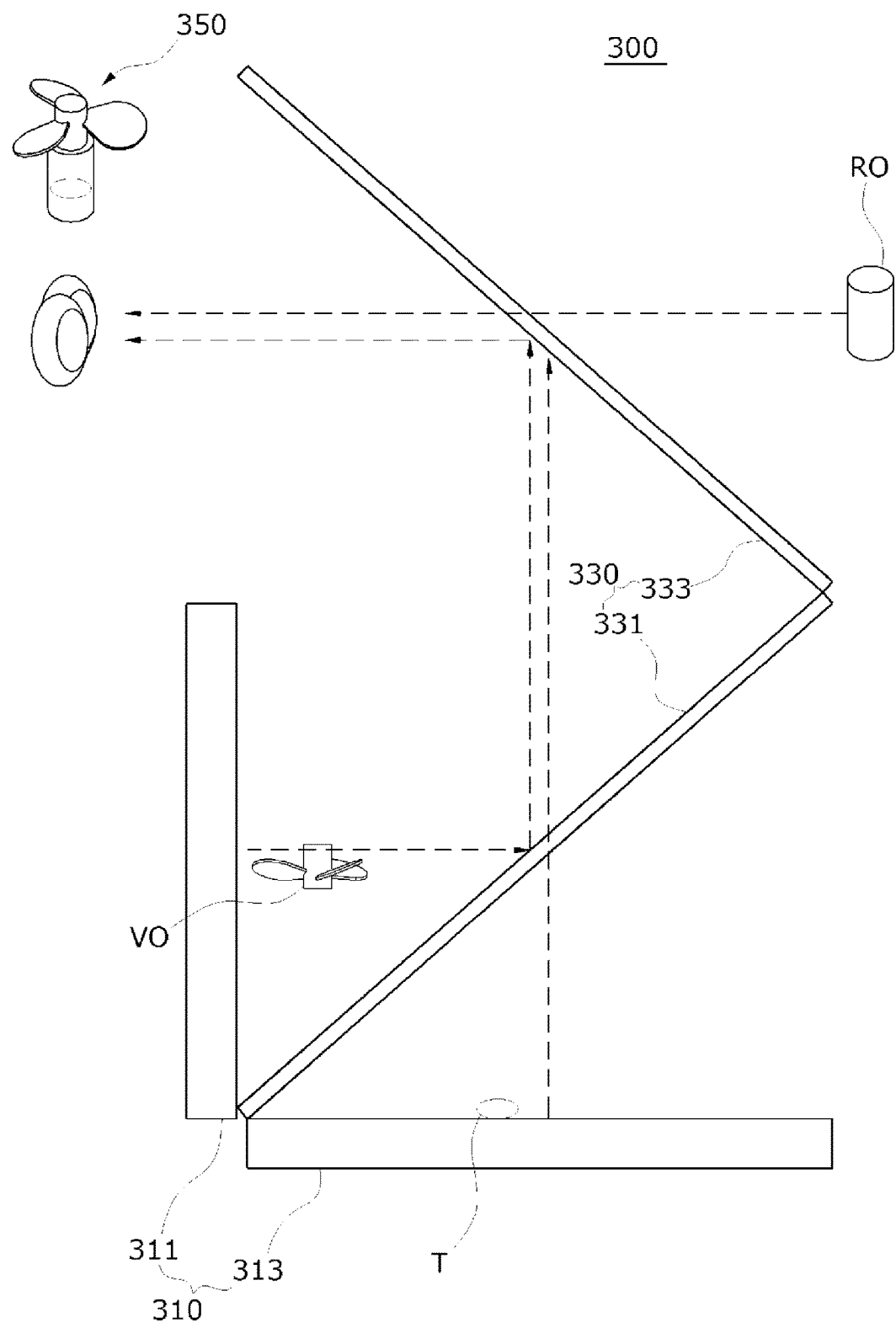
FIG. 3A is a diagram illustrating a structure of one example of an autostereoscopic 3D display apparatus according to a third embodiment of the present invention.
Figure 3B:
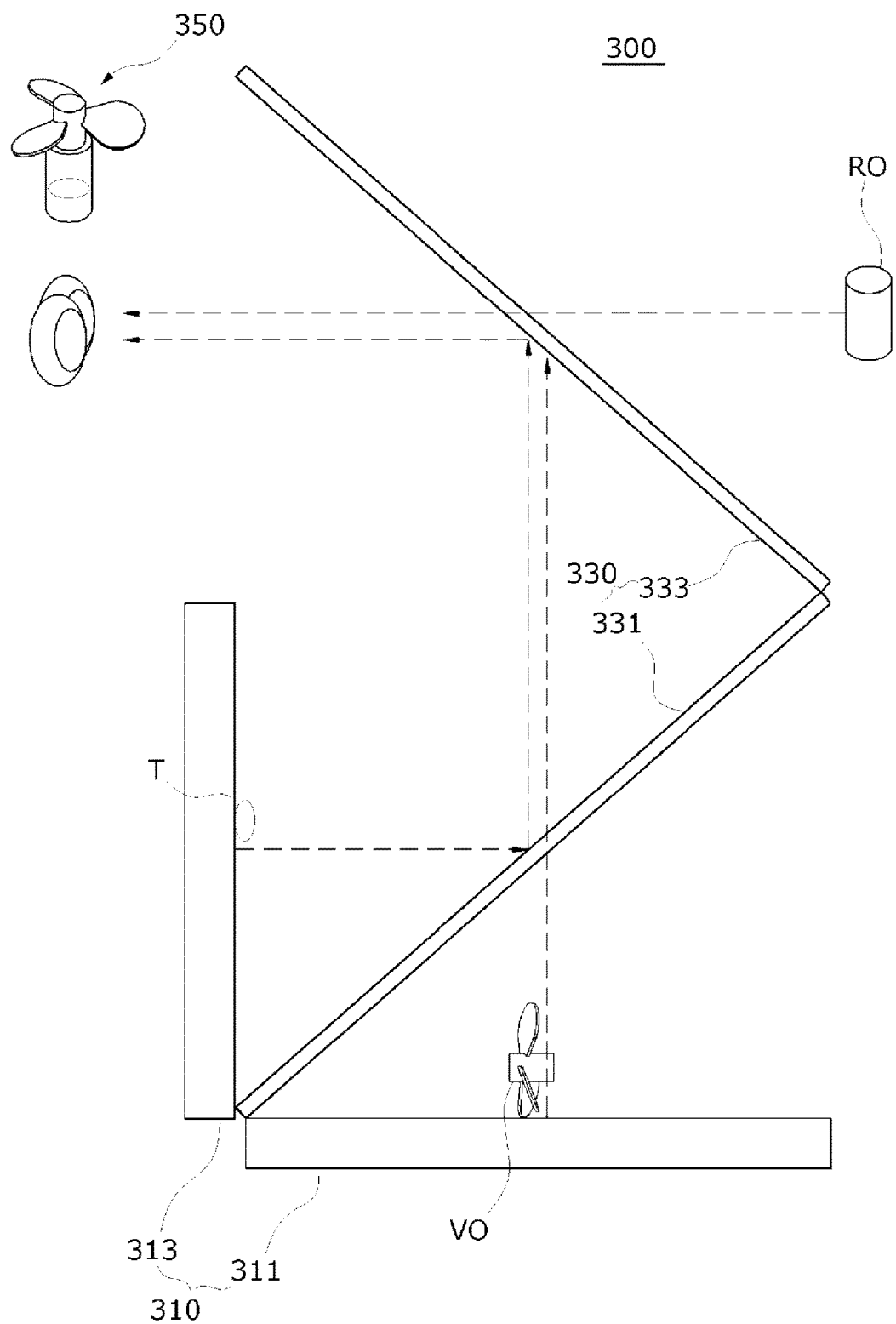
FIG. 3B is a diagram illustrating a structure of another example of an autostereoscopic 3D display apparatus according to the third embodiment of the present invention.

FIG. 3A is a diagram illustrating a structure of one example of an autostereoscopic 3D display apparatus according to a third embodiment of the present invention. FIG. 3B is a diagram illustrating a structure of another example of an autostereoscopic 3D display apparatus according to the third embodiment of the present invention.

Referring to FIGS. 3A and 3B, an autostereoscopic 3D display apparatus 300 according to the third embodiment of the present invention includes an image display unit 310 and an optical unit 330.

The image display unit 310 is configured to display a 3D image. The 3D image displayed using the image display unit 310 includes a 3D virtual object VO and text T.

For convenience of explanation, it will be described below that the image display unit 310 displays the 3D virtual object VO and the text T.

In this case, the image display unit 310 may include a first image display unit 311 for displaying the 3D virtual object VO and a second image display unit 313 for displaying the text T.

The first image display unit 311 may be a low-definition autostereoscopic 3D display panel. The second image display unit 313 may be a high-definition transparent 2D display panel.

The optical unit 330 displays the 3D virtual object VO and the text T displayed on the image display unit 310 to a viewer, and is configured to reflect and transmit the 3D virtual object VO and the text T to display them to the viewer.

Furthermore, the optical unit 330 is configured to display an image of a real object RO facing the viewer to the viewer.

That is, the optical unit 330 is configured to display a synthetic object 350 which is a combination of the 3D virtual object VO, the image of the real object RO, and the text T to the viewer.

In this case, the optical unit 330 may be embodied as a first beam splitter 331 and a second beam splitter 333.

The first beam splitter 331 reflects or transmits the 3D virtual object VO displayed on the first image display unit 311 to be incident on the second beam splitter 333.

Furthermore, the first beam splitter 331 reflects or transmits the text T displayed on the second image display unit 313 to be incident on the second beam splitter 333.

The second beam splitter 333 reflects the 3D virtual object VO and the text T incident from the first beam splitter 331 toward the viewer.

Furthermore, the second beam splitter 333 transmits the image of the real object RO behind the second beam splitter 333 to be displayed to the viewer.

The relationship between the locations of the image display unit 310 and the optical unit 330 of the autostereoscopic 3D display apparatus 300 according to the third embodiment of the present invention will be described in detail below.

According to the third embodiment of the present invention, the image display unit 310 is embodied as two image display units 311 and 313 and the optical unit 330 is embodied as two beam splitters 331 and 333.

As illustrated in FIG. 3A, the second beam splitter 333 is located in front of the real object RO with respect to the viewer and the first beam splitter 331 is located below the second beam splitter 333.

The second beam splitter 333 is located to transmit the image of the real object RO to be displayed to the viewer. The first beam splitter 331 is located to allow the 3D virtual object VO from the first image display unit 311 and the text T from the second image display unit 313 to be incident on the second beam splitter 333.

In this case, the first beam splitter 331 may be located below the second beam splitter 333 to be symmetrical to the second beam splitter 333.

The second image display unit 313 is located below the first beam splitter 331, and the first image display unit 311 is located in front of the first beam splitter 331 with respect to the viewer.

That is, the first beam splitter 331 reflects the 3D virtual object VO from the first image display unit 311 located in front of the first beam splitter 331 to the second beam splitter 333, and transmits the text T from the second image display unit 313 below the first beam splitter 331 to the second beam splitter 333.

Thus, the 3D virtual object VO from the first image display unit 311 is reflected to the second beam splitter 333 by the first beam splitter 331, and reflected toward the viewer by the second beam splitter 333.

The text from the second image display unit 313 is transmitted through the first beam splitter 331 to be incident on the second beam splitter 333, and reflected toward the viewer by the second beam splitter 333.

Accordingly, the viewer may view the synthetic object 350 which is a combination of the 3D virtual object VO from the first image display unit 311, the text T from the second image display unit 313, and the image of the real object RO and thus augmented reality may be implemented using the autostereoscopic 3D display apparatus 300 of FIG. 3A.

The structure illustrated in FIG. 3B is the same as that illustrated in FIG. 3A except that the locations of the first and second image display units 311 and 313 are switched to each other.

That is, in FIG. 3B, the first image display unit 311 is located below the first beam splitter 331 and the second image display unit 313 is located in front of the first beam splitter 331 with respect to the viewer.

Thus, the first beam splitter 331 reflects the text T from the second image display unit 313 located in front of the first beam splitter 331 to the second beam splitter 333, and transmits the 3D virtual object VO from the first image display unit 311 below the first beam splitter 331 to the second beam splitter 333.

Accordingly, the 3D virtual object VO from the first image display unit 311 is transmitted through the first beam splitter 331, incident on the second beam splitter 333, and reflected toward the viewer by the second beam splitter 333.

The text T from the second image display unit 313 is reflected to the second beam splitter 333 by the first beam splitter 331, and reflected toward the viewer by the second beam splitter 333.

Accordingly, the viewer may view the synthetic object 350 which is a combination of the 3D virtual object VO from the first image display unit 311, the text T from the second image display unit 313, and the image of the real object RO and thus augmented reality may be implemented using the autostereoscopic 3D display apparatus 300 of FIG. 3B.

As described above, an autostereoscopic 3D display apparatus according to an embodiment of the present invention includes a display screen having a transparent region for each pixel and a real object may be thus observed with a naked eye through the transparent region.

As described above, since the real object may be observed with a naked eye, 3D augmented reality may be implemented using a parallax barrier type autostereoscopic 3D display apparatus, similar to when a see-through display apparatus, e.g., Google Glass or MS HoloLens, is used.

While autostereoscopic 3D display apparatuses according to exemplary embodiments of the present invention have been described above, the scope of the present invention is not limited thereto and it would be obvious to those of ordinary skill in the art that these exemplary embodiments are to cover all alternatives, modifications, and equivalents falling within the scope of the invention.

Accordingly, the embodiments described herein and the appended drawings are not intended to restrict the scope of the present invention but are only used to describe the present invention. Thus, the scope of the present invention is not limited by these embodiments and the drawings. Thus, it is intended that the present invention covers all such modifications provided they come within the scope of the appended claims and their equivalents.

What is claimed is:

1. An autostereoscopic three-dimensional (3D) display apparatus comprising: an image display unit configured to display a 3D image including a 3D virtual object or a 3D image including a 3D virtual object and text; and an optical unit configured to reflect or transmit the displayed 3D image from the image display unit toward a viewer and transmit an image of a real object facing the viewer to display a combination of the 3D image and the image of the real object to the viewer, wherein the optical unit comprises one beam splitter in front of the real object, and the image display unit comprises a first image display unit located below the beam splitter and configured to display the 3D image including the 3D virtual object, wherein the beam splitter reflects the 3D image from the first image display unit toward the viewer.

2. The apparatus of claim 1, wherein the optical unit comprises one beam splitter in front of the real object, and
the image display unit displays the 3D image including the 3D virtual object and the text,
wherein the beam splitter reflects the 3D virtual object from the image display unit toward the viewer and reflects or transmits the text from the image display unit toward the viewer.

3. The apparatus of claim 2, wherein the image display unit comprises:
a first image display unit configured to display the 3D virtual object; and
a second image display unit configured to display the text,
wherein the first and second image display units are located in a vertical structure below the beam splitter such that the second image display unit is located above the first image display unit.

4. The apparatus of claim 2, wherein the image display unit comprises:
a first image display unit for displaying the 3D virtual object; and
a second image display unit for displaying the text,
wherein the first image display unit is located below the beam splitter, and
the second image display unit is located in front of the beam splitter.

5. The apparatus of claim 2, wherein the image display unit comprises:
a first image display unit for displaying the 3D virtual object; and
a second image display unit for displaying the text,
wherein the first image display unit is located below the beam splitter, and
the second image display unit is located behind the beam splitter.

6. The apparatus of claim 3, wherein the first image display unit is a low-definition autostereoscopic 3D display panel, and
the second image display unit is a high-definition transparent 2D display panel.

7. The apparatus of claim 1, wherein the image display unit displays the 3D image including the 3D virtual object and the text, and
the optical unit comprises:
a first beam splitter configured to reflect or transmit the 3D virtual object and the text from the image display unit; and
a second beam splitter configured to reflect the 3D virtual object and the text incident from the first beam splitter toward the viewer.

8. The apparatus of claim 7, wherein the second beam splitter is located below the first beam splitter to be symmetrical to the first beam splitter.

9. The apparatus of claim 8, wherein the image display unit comprises:
a first image display unit for displaying the 3D virtual object; and
a second image display unit for displaying the text,
wherein the first image display unit is located in front of the second beam splitter, and
the second image display unit is located below the second beam splitter.

10. The apparatus of claim 8, wherein the image display unit comprises:
a first image display unit for displaying the 3D virtual object; and
a second image display unit for displaying the text,
wherein the first image display unit is located below the second beam splitter, and
the second image display unit is located in front of the second beam splitter.

11. The apparatus of claim 9, wherein the first image display unit is a low-definition autostereoscopic 3D display panel, and
the second image display unit is a high-definition transparent 2D display panel.

* * * * *